US006203831B1

(12) United States Patent
Eder et al.

(10) Patent No.: US 6,203,831 B1
(45) Date of Patent: *Mar. 20, 2001

(54) PREPARATION AND PACKAGING OF A MULTI-LAYERED HEAT-TREATED DESSERT COMPOSITION

(75) Inventors: Hans-Christian Eder, Vienna (AT); Bernd Elhaus, Muehldorf am Inn (DE); Franz Liebenspacher, Winterthur (CH)

(73) Assignee: Nestec S.A., Vevey (CH)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/729,848

(22) Filed: Oct. 15, 1996

(30) Foreign Application Priority Data

Oct. 16, 1995 (EP) .................................................. 95202779

(51) Int. Cl.[7] ...................................................... A23G 9/00
(52) U.S. Cl. ..................... 426/103; 426/89; 426/100; 426/101; 426/104; 426/293; 426/302; 426/306; 426/307; 426/572
(58) Field of Search ................................ 426/89, 95, 100, 426/101, 104, 293, 302, 306, 307, 572, 103

(56) References Cited

U.S. PATENT DOCUMENTS

| 3,470,831 | 10/1969 | von Drachenfels . | |
|---|---|---|---|
| 4,542,024 | 9/1985 | Butcher et al. . | |
| 4,562,081 | * 12/1985 | Buttermann, III | 426/101 |
| 4,932,317 | 6/1990 | Hoormann . | |
| 5,194,274 | * 3/1993 | Oda | 426/101 |
| 5,283,070 | * 2/1994 | Bertrand et al. | 426/101 |
| 5,494,692 | * 2/1996 | Beyer et al. | 426/106 |

FOREIGN PATENT DOCUMENTS

| 2239986 | 2/1974 | (DE) . |
|---|---|---|
| 2252228A | of 1992 | (GB) . |
| 61-111660 | 5/1986 | (JP) . |
| 7213938 | 4/1973 | (NL) . |

OTHER PUBLICATIONS

Derwent Abstract, Acc. No. 86–179050/28, of Japanese Patent Document No. 61–111660 (1986).
Derwent Abstract Acc. No. 74–17708 V/10, of Jörss German Patent No. 2239986 (1974).
Patent Abstracts of Japan, vol. 005, No. 085, C–057, Abstract of Aoyagi Soubonke:KK, Japanese Patent Document 60–29956 (1981).
Abstract of Morinaga, Japanese Patent Document No. 37–12414 (1962).

* cited by examiner

Primary Examiner—Lien Tran
(74) Attorney, Agent, or Firm—Vogt & O'Donnell, LLP

(57) ABSTRACT

A multi-layer food composition packaged in a container has a layer of a sterilized fat-containing composition, such as a chocolate, on a heat-treated component, such as a mousse, a creme, a jelly and/or a sauce, and a heat-treated component may be positioned on the fat-containing composition layer. The heat-treated food component has a Bostwick viscosity less than 8 cm, and the fat-containing composition layer has a thickness of between 0.1 mm and 3 mm. The food component and sterilized fat-containing composition are introduced into the container under ultrahygienic or aseptic conditions, and after introduction of a heat-treated food component into the container, the fat-containing composition is sprayed under pressure onto the component.

45 Claims, 2 Drawing Sheets

PREPARATION AND PACKAGING OF A MULTI-LAYERED HEAT-TREATED DESSERT COMPOSITION

BACKGROUND OF THE INVENTION

The present invention relates to multi-layered food compositions and production thereof and particularly to a multi-layered dessert composition having a plurality of components including a heat-treated component inclusive of a mousse, creme, jelly and/or sauce.

In the chilled sector, multi-layer desserts are already available. They comprise various components, such as mousse and creme, which lie on top of one another.

It also already is known to coat bakery products with a chocolate layer. German Pat. No. 2 239 986 and its U.S. counterpart, U.S. Pat. No. 3,470,831, already relate to a process of this type. However, the apparatus which is used in accordance with this technology is a two-component nozzle, i.e., a nozzle which is operated by compressed air, and the process does not relate to multi-layer dessert technology.

SUMMARY OF THE INVENTION

The object underlying the present invention is to offer a multi-layer food composition, particularly a dessert, which comprises at least one heat-treated food component which comprises mousse, creme, jelly and/or sauce and which additionally comprises at least one brittle thin fat-containing composition layer, e.g., a chocolate, in order that the consumer, during consumption, on the one hand, experiences a cracking on penetrating the fat layer with a spoon and on the other hand, experiences a novel mouth-feel due to the parts of the fat-containing composition layer.

Accordingly, the present invention provides a process for preparing a multi-layer food composition, particularly a dessert, which is packaged in a container under ultrahygienic or aseptic conditions with ultrahygienic or aseptic machinery characterized in that in the packaging, a heat-treated food component having a Bostwick viscosity below 8 cm, which comprises a mousse, creme, jelly and/or sauce, is introduced into the container so that a portion of the container is filled, and a layer of a sterilized fat-containing composition mass, e.g. a chocolate mass, is applied onto the component by spraying the fat-containing composition mass under a pressure between 5 and 200 bar and at a temperature of between 20° C. and 60° C. to obtain a continuous fat-containing composition mass layer having a thickness of between 0.1 and 3 mm on the food component. The fat-containing composition mass may be a chocolate composition, and a further food component may be introduced onto the fat-containing composition mass layer so that two food components are separated by the fat-containing composition mass layer.

The present invention also provides a multi-layer food composition, particularly a dessert, comprising at least one heat-treated food component, which comprises a mousse, creme, jelly and/or sauce, and having a surface upon which is a continuous sterilized layer of a fat composition mass, including a chocolate mass, of a thickness between 0.1 and 3 mm, or two or more layers of the food components are separated by a continuous sterilized layer, or separate layers, of the fat-containing composition, e.g., a chocolate, of a thickness between 0.1 and 3 mm, and the food components have a Bostwick viscosity below 8 cm.

The product of the invention is intended to be offered in the chilled sector, and it should be consumed within 4 to 6 weeks of the date of manufacture.

DETAILED DESCRIPTION OF THE INVENTION

Various versions of the multi-layer dessert are to be contemplated, e.g. a first version, where there is only one food component which is layered with the fat-containing composition mass. The layer of fat-containing composition mass, e.g., a chocolate, is continuous, so that breaking of the layer can effectively take place during consumption. In a second version, for example, it is possible to have a layer of mousse and then a layer of chocolate, a layer of jelly, a new layer of chocolate and finally, the same mousse as mentioned above. All variations with various components are possible. In this case, it is necessary to have a continuous layer, so that the separation of the various components continues to be ensured even during storage and so that an additional cracking experience or mouth-feel results.

The thickness of the fat or chocolate composition layer is also critical. An excessively thin layer gives no feeling of breakage, and an excessively thick layer leads to too great an effort to break the layer with a spoon. It is therefore envisaged to have the thickness of the layer between 0.1 and 3 mm. Preferably the layer has a thickness of approximately 1 mm.

"Mousse" herein means a whipped milk fresh product. "Creme" herein means a milk phase containing gelating agents, such as a blancmange. "Jelly" herein means a fruit jam, and "sauce" denotes a milk phase or water phase which contains fruit and/or flavourings, such as vanilla.

All possible combinations, such as mousse/creme, mousse/sauce/mousse, pudding/sauce/pudding, come within the scope of the invention.

The food components must be heat-treated, i.e., they are either sterilized or pasteurized.

The respective food components must have a certain viscosity, in order that the layer of a chocolate or other fat-containing composition applied does not penetrate into this lower-lying component. The viscosity must also not be too high, otherwise smooth (even) filling is not possible. The Bostwick viscosity of the food components is below 8 cm. Bostwick viscosity is taken to mean the measurement of the flow path of a product on an inclined plane for 120 sec. at 20° C. This measurement is performed with an instrument from Kinematica AG (Littau, Switzerland). In the case of sauce, the Bostwick viscosity is in the vicinity of 8 and in the case of mousse, rather in the region of 2.

The fat-containing composition comprises vegetable fat, and if appropriate, cocoa powder, sugar and flavourings. Vegetable fat, e.g. a cocoa butter or hardened coconut fat, is present in the mixture in an amount of from 50 to 90%, that percentage, as are all percentages herein, being by weight. A chocolate composition used comprises a mixture of cocoa butter, cocoa powder or chocolate liquor, sugar and flavourings. The content of the cocoa butter is from 50 to 90% of the mixture.

The proportion of sugar in the chocolate or other fat-containing composition is up to 17%, including between 1 and 17%, and is preferably in the range from 2 to 3%. The sugar is liquid sugar.

In the case of the first version for preparing the multi-layer dessert, the filling line comprises a conveyor belt to feed the sterilized cups, a mousse filling station, a spraying station for the chocolate layer and a station for sealing the lid. In the case of the second version, in comparison with the above-mentioned line, additional stations must be provided for packaging the further mousse layers. In addition, a further spraying station must be included.

The chocolate or other fat-containing composition mass must be liquid during application, and for this reason, the temperature of this mass must be above the melting point, i.e., between 20 and 60° C. High pressure is employed, so that the spraying proceeds uniformly. The pressure must also not be too high, because of penetration and overspray. A pressure below 80 bar is preferably employed, and preferably, a pressure between 70 and 80 bar and a temperature of from 30° to 40° C. is employed.

Obviously, the entire line is under ultrahygienic or aseptic conditions.

The chocolate or other fat-containing composition mass is prepared by mixing the various ingredients of the composition to obtain a mixture. The mixture is dispersed and sterilized, usually at a temperature of approximately 125° C. for 5–10 min. The sterilized mass is then fed by a pump to a colloid mill or to a homogenizer to comminute the cocoa powder agglomerate. Filtration then follows.

The chocolate mass or fat-containing composition mass is then ready to be fed to the spraying system. In order to permit perfect spraying, care must be taken to ensure that a temperature above the melting point of the mass is always ensured in the feed system.

The spraying period depends on the particular layer thickness and the nozzle opening. Usually, the period for charging each cup is of the order of one second. This is in good agreement with the rate of existing filling machines.

Preferably, a spraying pressure between 70 and 80 bar is employed, and the temperature of a chocolate mass is approximately 30–40° C. This range provides the viscosity suitable for ensuring fault-free spraying.

The invention further relates to apparatus for producing and spraying the chocolate or other fat-containing composition mass to obtain the layer, the apparatus comprising two linked lines, a production line operated batchwise and a spraying line operated continuously. Herein, "production line" means a line for preparing the chocolate or other fat-containing mass.

The production line comprises the following interconnected elements:

dispersion and sterilization apparatus, pump, colloid mill or homogenizer and filter.

With a chocolate mass containing cocoa particles, treatment in a colloid mill or a homogenizer is necessary in order to grind the cocoa particles as finely as possible, in order to exclude a risk of blockage of the spraying system. The particle size is in the range from 100 to 200 microns.

When the chocolate or other fat-containing composition mass is ready, it is fed to a storage vessel having temperature control and is then transported by a pump to the single-component spraying system.

Concerning the single-component spraying system, the high pressure is maintained by a single piston pump, or one piston metering pump is provided for each spraying station. In the first solution, the spraying line includes a piston pump, at least one spray gun and a counterpressure valve, each spray gun comprising a pulsed needle valve and a hollow-cone swirl nozzle. In the second solution, the single-component spraying system has at least one single-component spray feeder, each single-component spray feeder comprising a pulsed piston metering pump, a pulsed needle valve and a hollow-cone swirl nozzle.

The single-component spray system comprises a plurality of spray guns or spray feeders, e.g. from 1 to 12.

For more detailed description of the invention, the invention is described with reference to the drawings and in the following working examples.

DETAILED DESCRIPTION OF THE DRAWINGS

Figure 1:
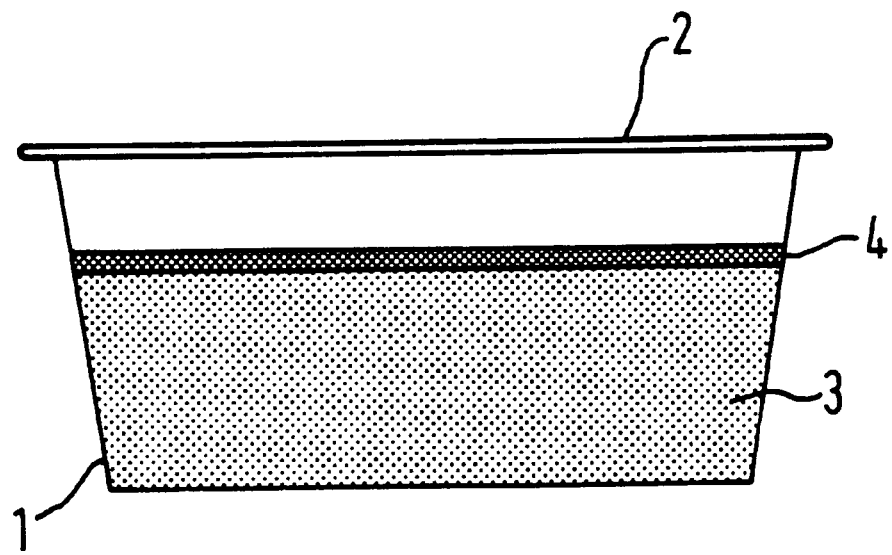
FIG. 1 shows a multi-layer dessert according to the first version.

As illustrated in FIG. 1, a container, illustrated as cup (1) with the lid (2) contains a mousse (3) which fills a portion of the cup container and has a surface which is coated with a layer of chocolate (4). The chocolate layer comprises a mixture of 50% cocoa powder, 46% cocoa fat, 3% liquid sugar and 1% flavouring. This layer has a thickness of 1.5 mm. The mousse comprises a whipped mixture of milk, fat, chocolate powder and thickener. It has a Bostwick viscosity of 5 cm. This dessert can be kept under refrigeration in a refrigerator for 4 weeks.

Figure 2:
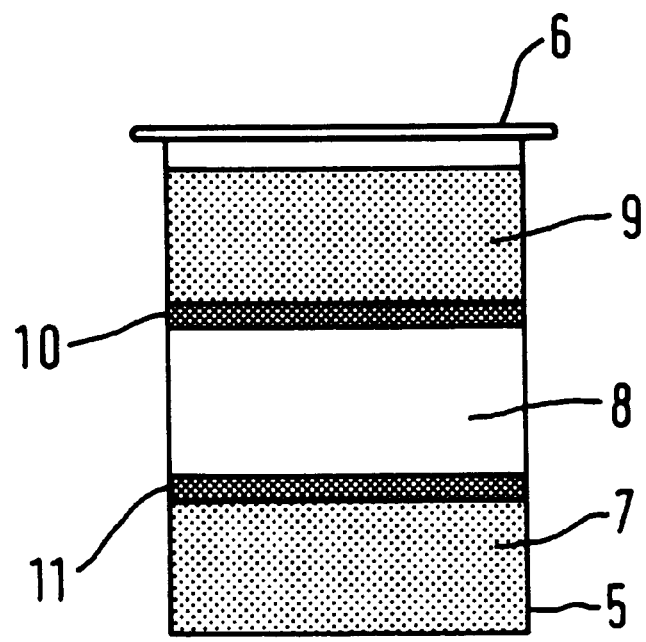
FIG. 2 shows a multi-layer dessert according to the second version.

FIG. 2 shows the second version. The cup container (5) with the lid (6) contains, from bottom to top of the cup, a mousse portion (7), a first layer of chocolate (11) on a surface of mousse (7), a sauce portion (8), a second layer of chocolate (10) on a surface of sauce (8) and a mousse portion (9), which is similar to the mousse (7). The composition of the mousse and the chocolate is the same as that in FIG. 1. The chocolate layers have a thickness of 1 mm. The sauce comprises a mixture of milk, flavourings and thickener and has a Bostwick viscosity of 6 cm.

Figure 3:
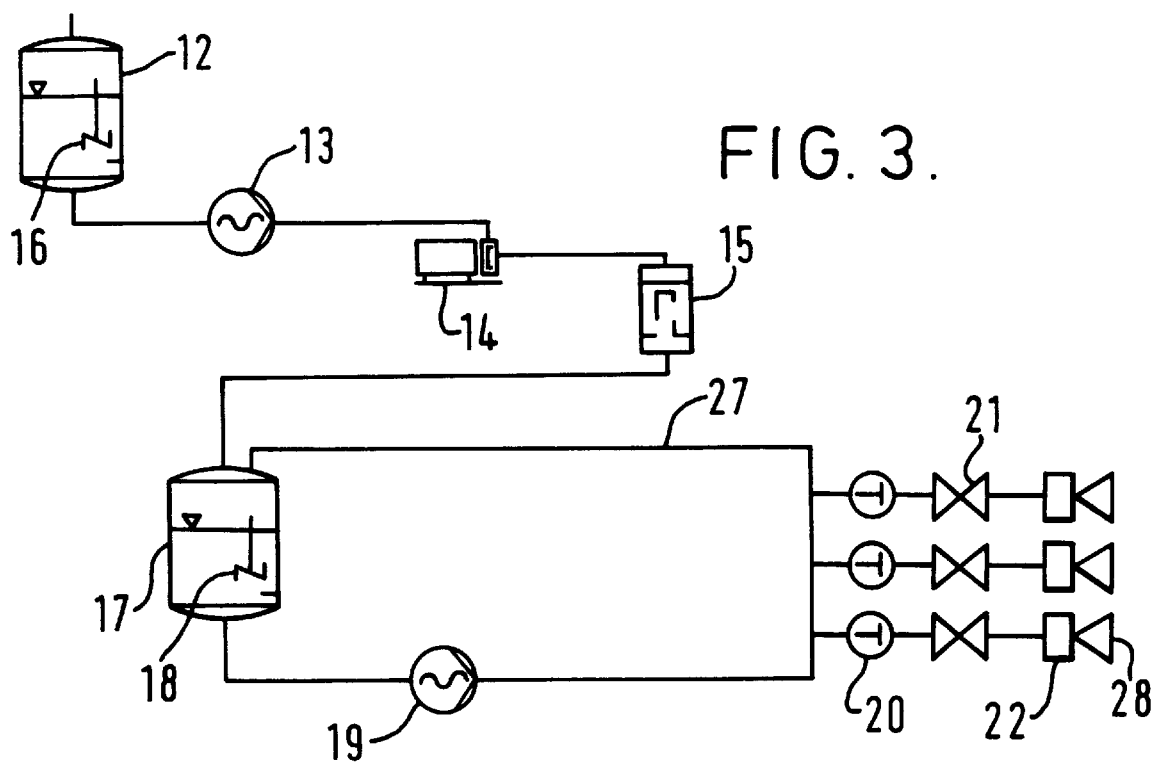
FIG. 3 shows a diagrammatic representation of the apparatus of the invention, according to the second solution.

In association with FIG. 3, the apparatus for preparing and spraying the chocolate mass is seen. In the tank (12), the mixture of the cocoa powder, the cocoa butter, the liquid sugar and the flavourings is prepared. The agitator (16) ensures a homogeneous mixture. [mixture:] This mixture is then sterilized at a temperature of 125° C. for 10 min. The pump (13) permits the sterilized chocolate mass to be fed to the colloid mill (14), the cocoa powder particles being ground to a size of approximately 100 microns. The filter (15) avoids ingress of coarse particles into the spray system. The entire apparatus is at a temperature of approximately 40° C. The filtered chocolate mass enters the tank (17), which mass is kept homogeneous with agitator (18). A pump (19) brings the mass to the respective single-component spray system, which comprises a piston metering pump (20), a needle valve (21) and a hollow-cone swirl nozzle (22). The piston metering pump forces a certain amount of chocolate into the storage chamber of the needle valve, the needle then opening and permitting the desired amount (28) of chocolate to be sprayed. Since the apparatus operates continuously, a certain amount of chocolate remains unused each time, which returns to the tank (17) through line (27). Usually, each piston metering pump is operated at a pressure of 75 bar, and the chocolate mass is kept at a temperature of 37–38° C. The piston metering pump and the needle valve operate cyclically. During the chocolate metering, the needle remains open for approximately 0.25 sec, a layer of 1.5 mm being metered. The line operates at 5000 cups per hour.

Figure 4:
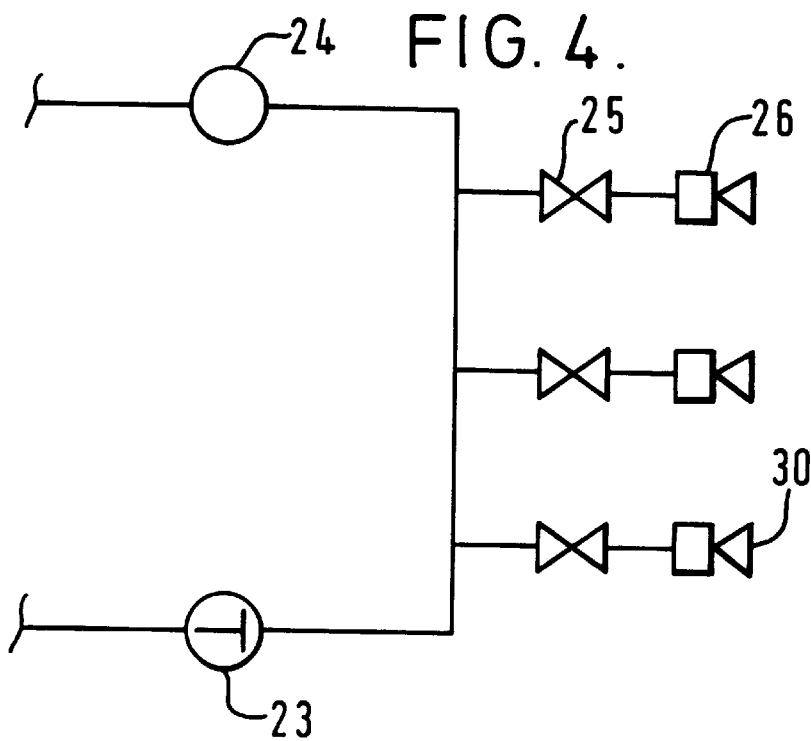
FIG. 4 shows a diagrammatic representation of the apparatus of the invention according to the first solution (with only the different high-pressure part).

FIG. 4 shows only the high-pressure part of the spray line according to the first solution. Downstream of a pump (19)

(FIG. 3) is then connected a single piston pump (23). It transports the chocolate to the spray guns, which comprise one pulsed needle valve (25) and one hollow-cone swirl nozzle (26) each, towards a counter-pressure valve (24). Downstream of the counter-pressure valve (24), the unsprayed chocolate passes back into the tank (17) (FIG. 3). The chocolate under high pressure (between piston pump (23) and counter-pressure valve (24)) is transported to the nozzles (26) by opening the needle valve (25), and the desired amount (30) is sprayed there.

What is claimed is:

1. A process for preparing a three-layered food composition contained in a container which consists essentially of conveying a line of a plurality of containers in a system with machinery which is under a condition selected from the group consisting of ultrahygienic and aseptic conditions and which are suitable for being sealed with a lid and for containing the three layered components, and in sequence, (i) introducing a heat-treated food component into the containers conveyed in an amount so that the heat-treated food component is contained within and occupies a portion of each container to provide a first multi-layer product food component portion, (ii) spraying into the containers conveyed and which contain the first food component a sterilized composition component which comprises a fat under a pressure between 5 bar and 200 bar and at a temperature between 20° C. and 60° C. so that the sterilized fat-containing composition is sprayed onto the first food component portion in the containers conveyed to cover the first food component portion with a continuous layer of the sterilized composition and so that the layer has a thickness between 0.1 mm and 3 mm, (iii) introducing a heat-treated food component onto that sterilized composition layer in the containers conveyed to provide a second multi-layer product food component portion, and (iv) sealing the containers with a lid and wherein the heat-treated food components are the same or different and have a Bostwick viscosity which is sufficient so that the sterilized composition layer does not penetrate the first food component and which is not more than 8 at 120 seconds at 20° C. and wherein the fat-containing composition is sprayed so that the fat-containing composition layer has a thickness between the 0.1 mm and 3 mm and wherein the thickness is sufficient so that the two food component portions are separated one from the other.

2. A process according to claim 1 wherein the heat-treated food component is selected from the group consisting of a mousse, a creme, jelly and a sauce.

3. A process according to claim 1 wherein the sterilized composition is sprayed under a pressure below 80 bar and above 5 bar.

4. A process according to claim 1 wherein the sterilized composition is sprayed under a pressure between 70 bar and 80 bar.

5. A process according to claim 1 wherein the sterilized composition sprayed is at a temperature of from 30° C. to 40° C.

6. A process according to claim 4 wherein the sterilized composition sprayed is at a temperature of from 30° C. to 40° C.

7. A process according to claim 1 wherein the sterilized composition fat is a vegetable fat.

8. A process according to claim 7 wherein the fat is a hardened coconut fat.

9. A process according to claim 1 wherein the sterilized composition comprises the fat in an amount of from 50% to 90% by weight.

10. A process according to claim 1 wherein the sterilized composition is a chocolate composition.

11. A process according to claim 1 wherein the sterilized composition further comprises sugar and an ingredient selected from the group consisting of cocoa powder and chocolate liquor and mixtures thereof.

12. A process according to claim 11 wherein the sterilized composition fat is cocoa butter.

13. A process according to claim 11 wherein the sterilized composition comprises the fat in an amount from 50% to 90% by weight.

14. A process according to claim 11 wherein the sterilized composition sprayed is at a temperature of from 30° C. to 40° C. and is sprayed under a pressure between 70 bar and 80 bar.

15. A process according to claim 12 wherein the sterilized composition sprayed is at a temperature of from 30° C. to 40° C. and is sprayed under a pressure between 70 bar and 80 bar.

16. A process according to claim 13 wherein the sterilized composition comprises the sugar present in an amount of up to 17% by weight.

17. A process according to claim 11 wherein the sterilized composition comprises the sugar in an amount of from 2% to 3% by weight.

18. A process according to claim 12 wherein the sterilized composition comprises the sugar in an amount of from 2% to 3% by weight.

19. A process according to claim 13 wherein the sterilized composition comprises the sugar in an amount of from 2% to 3% by weight.

20. A process according to claim 19 wherein the fat is cocoa butter.

21. A process according to claim 11 wherein the sterilized composition comprises cocoa powder and further comprising, prior to spraying, comminuting the sterilized composition to comminute the cocoa powder and filtering the comminuted sterilized composition.

22. A process according to claim 1 wherein the heat-treated food component is an at least pasteurized component.

23. A process for preparing and containing a multi-layer food composition comprising, in a system with machinery under a condition selected from the group consisting of ultrahygienic and aseptic conditions, introducing a heat-treated food component into a container so that the heat-treated food component is contained within and occupies a portion of the container and pumping a sterilized food composition component which comprises a fat at a temperature between 20° C. and 60° C. with a piston pump to a spray gun so that the gun sprays the sterilized composition under a pressure between 5 bar and 200 bar onto the heat-treated food component contained in the container to obtain a continuous sterilized fat-containing composition layer having a thickness between 0.1 mm and 3 mm which covers the heat-treated food component contained in the container, wherein the heat-treated food component has a Bostwick viscosity which is sufficient so that the fat-containing composition layer does not penetrate the food component and which is not more than 8 cm at 120 seconds at 20° C., to obtain a multi-layer food composition.

24. A process according to claim 23 wherein the sterilized composition further comprises cocoa powder and wherein the process further comprises, prior to pumping for spraying, comminuting the sterilized composition to comminute the cocoa powder and filtering the comminuted sterilized composition.

25. A process according to claim 23 wherein the sterilized composition is sprayed under a pressure below 80 bar and above 5 bar.

26. A process according to claim 23 wherein the sterilized composition is sprayed under a pressure between 70 bar and 80 bar.

27. A process according to claim 23 wherein the sterilized composition sprayed is at a temperature of from 30° C. to 40° C.

28. A process according to claim 26 wherein the sterilized composition sprayed is at a temperature of from 30° C. to 40° C.

29. A process according to claim 23 wherein the sterilized composition fat is a vegetable fat.

30. A process according to claim 29 wherein the fat is a hardened coconut fat.

31. A process according to claim 23 wherein the sterilized composition comprises the fat in an amount of from 50% to 90% by weight.

32. A process according to claim 23 wherein the sterilized composition is a chocolate composition.

33. A process according to claim 23 wherein the sterilized composition further comprises sugar and an ingredient selected from the group consisting of cocoa powder and chocolate liquor and mixtures thereof.

34. A process according to claim 33 wherein the sterilized composition fat is cocoa butter.

35. A process according to claim 33 wherein the sterilized composition comprises the fat in an amount from 50% to 90% by weight.

36. A process according to claim 33 wherein the sterilized composition sprayed is at a temperature of from 30° C. to 40° C. and is sprayed under a pressure between 70 bar and 80 bar.

37. A process according to claim 34 wherein the sterilized composition sprayed is at a temperature of from 30° C. to 40° C. and is sprayed under a pressure between 70 bar and 80 bar.

38. A process according to claim 35 wherein the sterilized composition comprises the sugar present in an amount of up to 17% by weight.

39. A process according to claim 33 wherein the sterilized composition comprises the sugar in an amount of from 2% to 3% by weight.

40. A process according to claim 34 wherein the sterilized composition comprises the sugar in an amount of from 2% to 3% by weight.

41. A process according to claim 35 wherein the sterilized composition comprises the sugar in an amount of from 2% to 3% by weight.

42. A process according to claim 41 wherein the fat is cocoa butter.

43. A process according to claim 23 wherein the heat-treated food component is selected from the group consisting of a mousse, a creme, jelly and a sauce.

44. A process according to claim 23 wherein the heat-treated food component is an at least pasteurized component.

45. A process according to claim 23 further comprising introducing a heat-treated food component onto the fat layer.

* * * * *